United States Patent [19]
Fedrick

[11] 3,815,078
[45] June 4, 1974

[54] RETRACTABLE EXTENSION CORD UNIT

[76] Inventor: Nicolas W. Fedrick, 155 Acalames Dr., Sunnyvale, Calif. 94040

[22] Filed: Aug. 31, 1972

[21] Appl. No.: 285,452

[52] U.S. Cl. ........... 339/28 R, 191/12.4, 339/147 C
[51] Int. Cl. ............................................. H01r 11/00
[58] Field of Search ......... 339/119 C, 147 C, 5 RL, 339/28, 29; 191/12, 12.2, 12.4

[56] References Cited
UNITED STATES PATENTS

| | | | |
|---|---|---|---|
| 914,772 | 3/1909 | Williamson | 191/12.4 |
| 1,730,104 | 10/1929 | Wheat | 191/12.4 |
| 2,007,699 | 7/1935 | Wiebking | 339/5 RL |
| 2,070,561 | 2/1937 | Cantor | 191/12.4 |
| 2,801,303 | 7/1957 | Pailing | 191/12.4 |
| 2,856,470 | 10/1958 | Hyde | 191/12.4 |
| 2,976,374 | 3/1961 | Paulson | 339/147 C X |
| 2,979,576 | 4/1961 | Huber | 191/12.4 |
| 3,056,863 | 10/1962 | Johnson | 191/12.4 |

FOREIGN PATENTS OR APPLICATIONS

| | | | |
|---|---|---|---|
| 23,986 | 9/1883 | Germany | 339/5 RL |

*Primary Examiner*—Joseph H. McGlynn
*Assistant Examiner*—Terrell P. Lewis
*Attorney, Agent, or Firm*—Paul B. Fihe

[57] ABSTRACT

A retractable extension cord unit including a small housing within which the cord can be stored but formed from two relatively rotatable members whose rotation enables selected extension or retraction of the cord.

2 Claims, 4 Drawing Figures

PATENTED JUN 4 1974 3,815,078

RETRACTABLE EXTENSION CORD UNIT

FIELD OF THE INVENTION

The present invention relates generally to electrical extension cords, and more particularly, to a retractable extension cord unit enabling storage of excess cord.

BACKGROUND OF THE INVENTION

Extension cords are widely used in industrial and commercial establishments as well as in residences. Excessive amounts of cord lying on a floor can provide safety hazards from tripping or actual breakage and consequent electrical shock to a person, and moreover, are extremely unsightly, an esthetic consequence which is unacceptable to many home owners.

Whereas retraction mechanisms for electrical cords have been incorporated in certain household machines such as any vacuum cleaners, they constitute relatively sizeable and expensive units so as to be inapplicable to a simple extension cord and only somewhat ineffective add on elements such as coil springs have been utilized in an attempt to provide retraction of excessive cord lengths.

SUMMARY OF THE INVENTION

Accordingly, it is the general objective of the present invention to provide a retractable extension cord unit which can readily be connected to a conventional household electrical outlet and enables selected extension of the cord while retaining the remainder in a simple, inexpensive storage housing. Briefly, such objective is achieved by providing a small housing composed of two relatively rotatable members within which the extension cord can be stored or through whose relative rotation can be extended therefrom for any selected distance. One of the housing members incorporates an electrical connector such as a two pronged plug for insertion in a conventional household electrical wall socket, one end of the extension cord being electrically connected to such connector and thence extending in a coiled configuration around a central post which provides the relative rotatable support of the two housing members. The other housing member is provided with a small lateral opening through which the cord can be extended to the desired distance, the two members automatically rotating in response to an external manual pull on the cord to enable its extension to the desired distance. In turn, when the cord is to be completely withdrawn, the one housing member is merely rotated relative to the other to effect retraction of the cord in a manual operation which is generally analogous to the winding of line on a fishing reel.

BRIEF DESCRIPTION OF THE DRAWING

The stated objective of the invention and the manner in which it is achieved as summarized hereinabove will be more readily understood by a perusal of the following detailed description of an exemplary embodiment of the invention shown in the accompanying drawing wherein.

DETAILED DESCRIPTION OF THE EXEMPLARY EMBODIMENT OF THE INVENTION

Figure 1:
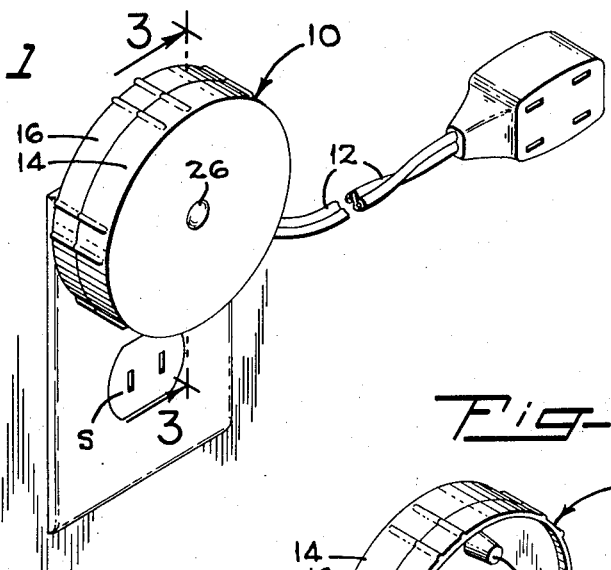
FIG. 1 is a perspective view of a retractable extension cord unit embodying the present invention inserted in one section of a standard dual wall outlet.
Figure 2:
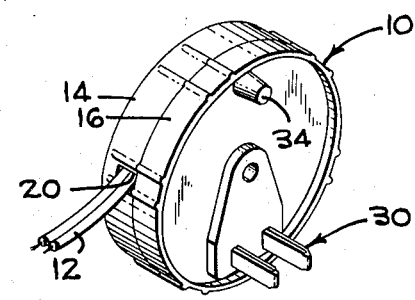
FIG. 2 is an enlarged perspective view of the same single retractable extension cord unit separated from the wall socket and showing the reverse surface thereof.

As shown in the drawings, the retractable extension cord unit includes a housing 10 which can be of any size, but as illustrated, is approximately the size of a package of cigarettes being of generally cylindrical shape with a three inch diameter and a one inch depth. A housing 10 of these relatively small dimensions is capable of full coiled storage therewithin of an electrical extension cord 12 of standard transverse dimensions and a length of approximately 6 feet, so as to be capable of meeting most household extension cord requirements.

Figure 3:
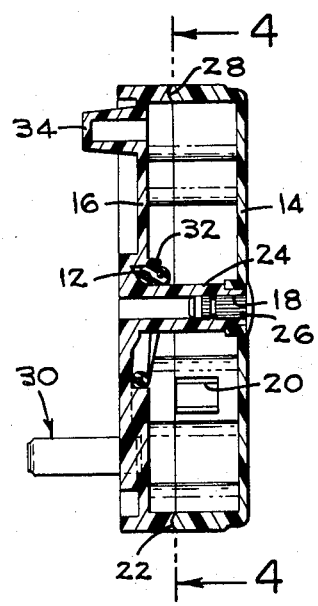
FIG. 3 is an enlarged central sectional view of the unit taken along lines 3—3 of FIG. 1.
Figure 4:
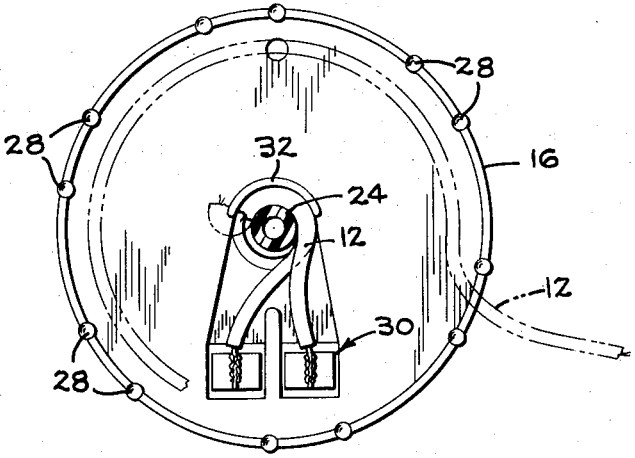
FIG. 4 is a transverse central sectional view taken along line 4—4 of FIG. 3.

As can be best visualized by reference to FIG. 3, the housing 10 is formed by two members 14, 16, each of which generally takes the form of a shallow cylindrical cup formed of thin light weight plastic material which is slightly resilient. The first housing member 14 is provided with a small central opening 18 in its bottom portion and another slot or opening 20 in its side wall and preferably includes a number of small protuberances 22 at selected circumferential positions on its rim.

The small central opening 18 in the first housing member 14 is arranged to receive the reduced end of a center post 24 that projects centrally from the bottom of the second housing member 16 so that the two are rotatably connected. The end of the center post 24 is hollow so as to be capable of reception of a securing member 26 which can take the form of a rivet or screw which when applied holds the two members in rim abutting relationship to form the complete housing. Preferably, application of the securing member 26 is such as to create a slight compression of the central portions of the housing members 14, 16, thus to bring the rims of the cup-shaped members into slight resilient contact. Slight depressions 28 are formed in the rim of the second housing member 16 in positions capable of registry with the described protuberances 22 in the first member 14 so that while the two members can be relatively rotated, when the protuberances 22 in the first housing member 14 enter the recesses 28 in the second housing member 16, a resilient detent or holding arrangement is provided to preclude accidental relative rotation of the housing members.

The second housing member 16 is formed to receive an electrical connector and as illustrated includes a pair of slots adjacent its peripheral portion that receive metal prongs of a male electrical plug 30 which project from its bottom for insertion in a standard wall socket S, as shown in FIG. 1. The disposition of the male plug 30 adjacent the perimeter of the second housing member 16 enables two of the retractable extension cord units to be inserted into adjoining sockets S in the common dual wall socket found in most residential installations.

The exposed ends of the two wires of the mentioned extension cord 12 are soldered to the interior portions of the prongs of the plug 30 and the cord then passes around the centerpost in a coiled or spiral formation with its opposite extremity extending through the opening 20 in the first housing member 14.

To avoid excessive pull and possible breakage of the connection of the wires to the prongs of the male plug 30, an arcuate member 32 is formed integrally with the second housing member 16 in slightly spaced relation to the central post 24 to form conjointly therewith a cord holding means. More particularly, the slot formed between the post 24 and the arcuate member 32 is of a width such that the electrical cord 12 can be pressed therein to be held frictionally, thus to establish a good mechanical connection which avoids the unwanted pull on the soldered connections at the end of the cord.

Additionally, the second housing member 16 is also preferably formed with a small exterior integral rod or handle 34 that projects from the bottom of the cup-shaped second housing member 16 enabling ready manual access so as to facilitate manual turning of this second housing member while the first housing member 14 is held in the other hand.

If the cord 12 has previously been unwound from the housing by mere pulling on its end, it can be returned to its coiled or stored position, either partial or complete within the housing 10 by manual holding of the first housing member 14 while rotating the other housing member 16, for example, by use of the described handle 34, thus to effect a winding of the cord around the centerpost 24 in the described spiral coiled configuration.

It is to be particularly observed that the basic unit is formed from but two plastic members 14, 16 which can be produced in extremely large quantities at relatively low cost and yet which perform, because of their particular design features, a multiplicity of separate, but coordinated functions.

A large number of modifications and/or alterations in this structure as specifically described can be made without departing from the spirit of the invention, and accordingly, the foregoing description of but one embodiment is to be considered as purely exemplary and not in a limiting sense, and the actual scope of the invention is to be indicated only by reference to the appended claims.

What is claimed is:

1. A retractable extension cord unit which comprises a housing formed by first and second relatively rotatable members, said first member having an opening therethrough, an electrical connector in said second member, an extension cord electrically connected to said electrical connector within said housing and extending therefrom through said opening, means automatically operative in response to relative rotation of said two housing members in one direction to wind said cord within said housing and in the opposite direction to permit unwinding of said cord through said opening, said automatic winding means including a centerpost connected to said second member and rotatively engaging a center opening in said first member to maintain the aligned relation of said members but enabling the relative rotation thereof, and cord holding means including a member on said second housing member adjacent said centerpost to form a slot dimensioned for the releasable pressed holding of said extension cord.

2. A retractable extension cord unit which comprises a housing formed by first and second relatively rotatable members, said first member having an opening therethrough, an electrical connector in said second member, an extension cord electrically connected to said electrical connector within said housing and extending therefrom through said opening, and means automatically operative in response to relative rotation of said two housing members in one direction to wind said cord within said housing and in the opposite direction to permit unwinding of said cord through said opening, said housing members each having the form of generally shallow cylindrical cups of like diameters arranged in edgewise-abutting relation to form said housing, said cup-shaped housing members being formed of resilient plastic and the respective edges thereof having recesses and protuberances capable of registering interengagement to resiliently hold said members against relative rotation.

* * * * *